LELAND W. GREEN
STANLEY E. SUMMERS
INVENTORS

BY Hazard & Miller

ATTORNEYS

United States Patent Office 2,796,082
Patented June 18, 1957

2,796,082
PILOT ACTUATED BUTTERFLY VALVE

Leland W. Green and Stanley E. Summers, El Segundo, Calif., assignors to Interstate Engineering Corporation, El Segundo, Calif., a corporation of California Application February 14, 1955, Serial No. 487,955

4 Claims. (Cl. 137—630.15)

This invention relates to improvements in butterfly valves.

Explanatory of the present invention, the conventional or usual butterfly valve is disposed within a duct and is rotatable, such as by a shaft on a diametric axis extending across the duct. When the valve is opened, approximately one-half of the valve swings about the axis in an upstream direction in the duct and the other half of the valve swings in a downstream direction. When the valve is only partially opened or unseated, although the areas of the upstream half and downstream half may be equal or substantially so, the forces developed on the two halves are not exactly equal. The fluid flowing against the downstream half of the valve tends to urge the valve to open to a greater extent whereas fluid flowing against the upstream half tends to close the valve. When the valve is partially opened, the effect of the fluid flowing around the edge of the upstream half causes a greater force to be developed on the upstream half tending to close the valve than the force effective on the downstream half which tends to open the valve. Consequently, when the valve is only slightly opened, there may be a considerable net or resultant force tending to close the valve.

It is highly desirable in a butterfly valve to reduce or compensate for this closing effect developed by the fluid flowing through the duct upon the butterfly valve so that in various open positions of the valve no great amount of effort is required to maintain the valve in its open position.

A primary object of the present invention is to provide an improved butterfly valve wherein the upstream half of the valve is equipped with a pilot valve that is opened by the butterfly valve shaft when opening movement of the main butterfly valve is about to commence. This opening of the pilot valve reduces the effective area of the upstream half of the valve so that the effects of the fluid flowing through the duct on both halves of the valve will become substantially balanced or equal with the result that there is no net or resultant force urging the valve to return to its closed position.

Another object of the present invention is to provide a butterfly valve consisting of a duct in which a main butterfly valve is rotatably disposed on a valve shaft and wherein the upstream half of the main butterfly valve has a pilot butterfly valve therein connected by a linkage to the main butterfly valve shaft so as to be operable thereby. A spring means is employed between the main butterfly valve and the butterfly valve shaft which urges the main butterfly valve to open when the valve shaft is rotating to open position but which is, nevertheless, yieldable so that the main butterfly valve will be caused to follow opening movements of the valve shaft and assume a position of equilibrium with relation to the degree of opening of the pilot butterfly valve.

With the foregoing and other objects in view, which will be made manifest in the following detailed description and specifically pointed out in the appended claims, reference is had to the accompanying drawings for an illustrative embodiment of the invention, wherein:

Figure 1:
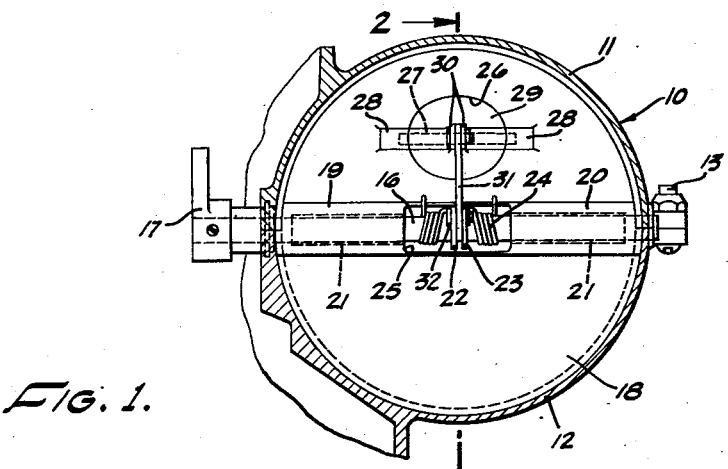
Figure 1 is a transverse vertical section through a duct in which there is a butterfly valve embodying the present invention, the valve being shown in closed position.

Referring to the accompanying drawings wherein similar reference characters designate similar parts throughout, the improved valve consists of a duct, generally indicated at 10, in which fluid, such as a gas or air, may be caused to flow. In the illustrations given the direction of flow may be assumed to be from left to right.

The duct may be made in any suitable manner and in the illustrations it is shown as being made of two opposed semi-cylindrical halves 11 and 12 suitably secured together, such as by bolts 13. We have illustrated the duct as being formed to provide inclined seats 14 and 15, the seat 14 being for the upstream half of the butterfly valve and the seat 15 being for the downstream half of the main butterfly valve. The invention, however, is in no way restricted to the use of seats for the main butterfly valve, or to the use of inclined seats therefor. It is equally applicable to butterfly valves which merely extend across the duct without seats, or if seats are present these may be arranged at substantially right angles to the axis of the duct.

A main butterfly valve shaft 16 extends diametrically across the duct and is suitably journalled in the walls thereof. This main butterfly valve can be rotated by any suitable exciter or prime mover, such as by a crank 17. The main butterfly valve 18 has journals 19 and 20 formed thereon through which the shaft 16 rotatably extends. 21 indicates bushings that may be between the journals and the shaft so that, in effect, the main butterfly valve is loosely mounted on the shaft 16.

The shaft 16 has a pair of cranks 22 and 23 rigid therewith and a torsion spring 24 is wrapped around the shaft 16 and is looped over the cranks and has its ends bearing against the top of the recess 25 formed between the journals. The spring 24 urges the main butterfly valve 18 into open position when the shaft 16 is rotated in that direction. Thus, if the shaft 16 is rotated in a counter-clockwise direction, as viewed in Fig. 2, the effect of the spring 24 is to urge the butterfly valve 18 to rotate in the same direction. However, this action of the spring is yieldable, as will be readily understood.

In the upstream half of the valve 18 there is an opening 26 across which there extends a pilot butterfly valve shaft 27, the ends of which are journalled, as at 28, on the main butterfly valve 18. This pilot butterfly valve shaft has a pilot butterfly valve 29 rigidly mounted thereon which is equipped with a pair of cranks 30. A link 31 is pivoted as at 32 to the cranks 22 and 23 and is also pivoted as at 33 to the cranks 30.

Figure 2:
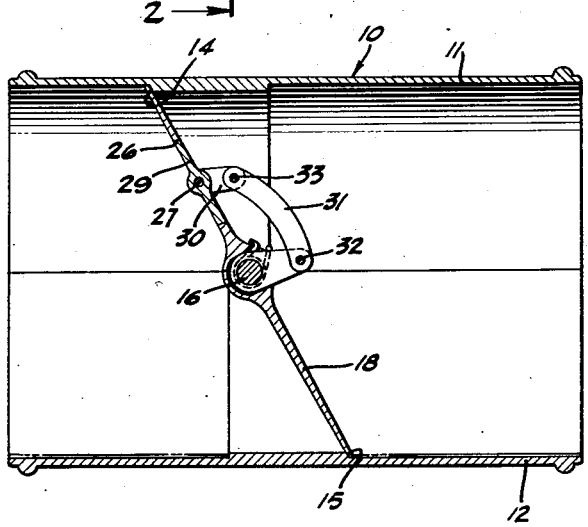
Figure 2 is a longitudinal section through the duct taken substantially upon the line 2—2 upon Fig. 1, the valve being shown in closed position.
Figure 3:
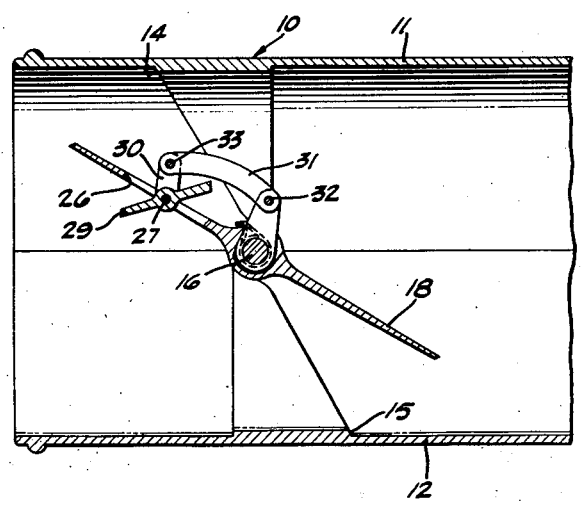
Fig. 3 is a view similar to Fig. 2, illustrating the valve in one of its open positions.

The operation of the valve as above described is substantially as follows. When the valve is in closed position, as shown in Fig. 2, and it is desired to open it, the shaft 16 is rotated by the crank 17 in a counter-clockwise direction, as viewed in Figs. 2 and 3. This rotation of the shaft produces two effects: (1) the spring 24 is stressed to urge the main butterfly valve 18 into open position; (2) the swinging movement of the cranks 22 and 23 transmitted by the link 31 to the cranks 30 causes the pilot butterfly valve 29 to rotate from its closed position into a partially open position, depending upon the degree of rotation of the shaft 16. The opening of the aperture 26 reduces the effective area of the upstream half of the main butterfly valve 18 so that the force effective on the upstream half is slightly less than the force effective on the downstream half. Consequently, the force of the fluid flowing through the duct is effective to cause the main butterfly valve to open. As the main butterfly valve opens, it tends to cause the pilot butterfly valve 29 to return to its closed position and finally a condition of equilibrium will be reached wherein the main butterfly valve will be open to an extent commiserate with the degree of rotation of the shaft 16. Conversely, if the shaft 16 is rotated in a clockwise direction from the position shown in Fig. 3 it will tend to close the pilot butterfly valve 29 and, thus, increase the effective area of the upstream half of the main butterfly valve which is subject to the fluid flowing through the duct. This increase in area causes the upstream half of the butterfly valve to have more force developed thereon, urging the valve to close and, consequently, the main butterfly valve 18 will start upon its closing movement until either an equilibrium condition is reached or the valve is fully closed, depending upon the degree of rotation of the shaft 16.

The cranks 22 and 23 are, of course, engageable with the top and bottom marginal edges of the recess 25 and under extreme conditions these cranks may engage these marginal edges and force the main butterfly valve 18 to open or to close, as the case may be. Under normal operating conditions, however, the valve 18 follows the opening and closing of the pilot butterfly valve 29 until an equilibrium condition is reached without the cranks 22 and 23 engaging the marginal edges of the recess.

It will be appreciated that a butterfly valve constructed as above described is highly advantageous in that no great force is required to be applied to the crank 17 to start the valve in its opening movement from its fully closed position. Likewise, when the main butterfly valve 18 is nearly closed no great force need be applied to the crank 17 to maintain the butterfly valve in its nearly closed but still open position. Consequently, for all positions of the butterfly valve the force required to rotate the shaft 16 from one position to another may be substantially constant or uniform, enabling the butterfly valve to be used in conjunction with highly sensitive exciting or prime moving mechanisms.

Various changes may be made in the details of construction without departing from the spirit and scope of the invention as defined by the appended claims.

We claim:

1. A butterfly valve comprising means providing a duct, a butterfly valve shaft extending thereacross, a main butterfly valve extending across the duct rotatably mounted upon the shaft, means connecting the valve and shaft for urging the valve to rotate sympathetically with the shaft when the shaft is turned toward open position, there being an opening in that half of the main butterfly valve that is moved in an upstream direction when the valve is turned to open position, a pilot valve rotatably mounted on the main butterfly valve in said opening, linkage connecting the pilot valve and valve shaft so that when the valve shaft is rotated toward open position the pilot butterfly valve will be rotated to open position to at least partially compensate for the unbalanced forces exerted on the two halves of the main valve when the main valve is partially open.

2. A butterfly valve comprising means providing a duct, a butterfly valve shaft rotatably mounted therein, a main butterfly valve extending across the duct and rotatably mounted upon the shaft, there being an opening wholly disposed in that half of the butterfly valve that is moved in an upstream direction when the valve is turned to open position, a pilot valve for said opening, and means connecting the butterfly valve shaft to the pilot valve whereby the pilot valve may be opened thereby on rotation of the shaft.

3. A butterfly valve comprising means providing a duct, a butterfly valve shaft rotatably mounted therein, a main butterfly valve extending across the duct and rotatably mounted upon the shaft, there being an opening in that half of the butterfly valve that is moved in an upstream direction when the valve is turned to open position, a pilot valve for said opening, and means connecting the butterfly valve shaft to the pilot valve whereby the pilot valve may be opened thereby on rotation of the shaft, and spring means between the butterfly valve shaft and the main butterfly valve for urging the main butterfly valve to rotate sympathetically with the shaft when the valve shaft is rotated towards open position.

4. A butterfly valve comprising means providing a duct, a butterfly valve shaft extending thereacross and rotatably mounted on the duct, a main butterfly valve extending across the duct rotatably mounted upon the shaft, there being a recess in the main butterfly valve about the valve shaft, a spring on the valve shaft urging the main butterfly valve to rotate sympathetically with the valve shaft when the valve shaft is rotated towards open position, crank means on the valve shaft disposed in the recess, there being an opening in that half of the butterfly valve that is moved in an upstream direction when the valve is turned to opened position, a pilot butterfly valve rotatably mounted on the main butterfly valve and extending across said opening, crank means on the pilot butterfly valve, and a link connecting the crank means on the pilot butterfly valve with the crank means on the valve shaft whereby when the valve shaft is rotated toward open position the pilot butterfly valve will be open and the main butterfly valve will be urged to open until an equilibrium condition has been reached.

References Cited in the file of this patent
UNITED STATES PATENTS
2,412,918    Sladky _____ Dec. 17, 1946